United States Patent [19]
Poncet

[11] Patent Number: 4,924,666
[45] Date of Patent: May 15, 1990

[54] MACHINE FOR HARVESTING BERRIES, AND PARTICULARLY, GRAPES

[75] Inventor: Bernard Poncet, Gradignan, France

[73] Assignee: Poly-Vecture, Langon, France

[21] Appl. No.: 402,189

[22] Filed: Sep. 5, 1989

[30] Foreign Application Priority Data

Sep. 5, 1988 [FR] France ................. 88 11590

[51] Int. Cl.⁵ ............................................. A01D 46/28
[52] U.S. Cl. ..................................................... 56/330
[58] Field of Search ....................... 56/328.1, 330, 331, 56/340.1

[56] References Cited

U.S. PATENT DOCUMENTS

| | | | |
|---|---|---|---|
| 4,370,847 | 2/1983 | Arnaud | 56/330 |
| 4,769,979 | 9/1988 | Merant | 56/330 |
| 4,771,594 | 9/1988 | Deux et al. | 56/330 |

FOREIGN PATENT DOCUMENTS

| | | |
|---|---|---|
| 0266259 | 5/1988 | European Pat. Off. . |
| 0267829 | 5/1988 | European Pat. Off. . |

*Primary Examiner*—Thuy M. Bui
*Attorney, Agent, or Firm*—Hoffman, Wasson, Fallow & Gitler

[57] ABSTRACT

The invention relates to a machine for harvesting berries, and particularly, grapes, comprising a straddling frame (1) on which are mounted two sets of shaking elements (4a, 4b), each on one side of the median plane of the machine, said shaking elements consisting of rods curved in an approximately horizontal plane and exhibiting their convexity in the direction of said median plane.

Each end of each rod is jointed to a support mounted to pivot around an approximately vertical pin, drive members (12) being provided to move, in phase, the supports of rods located on the same side of the median plane so as to move the rods parallel to themselves, and to move, in phase opposition, the supports of the rods located on one of the sides of the median plane relative to the supports of the rods located on the other side of the median plane so that, when one of the sets of rods approaches the median plane, the other set of rods moves away from it.

5 Claims, 2 Drawing Sheets

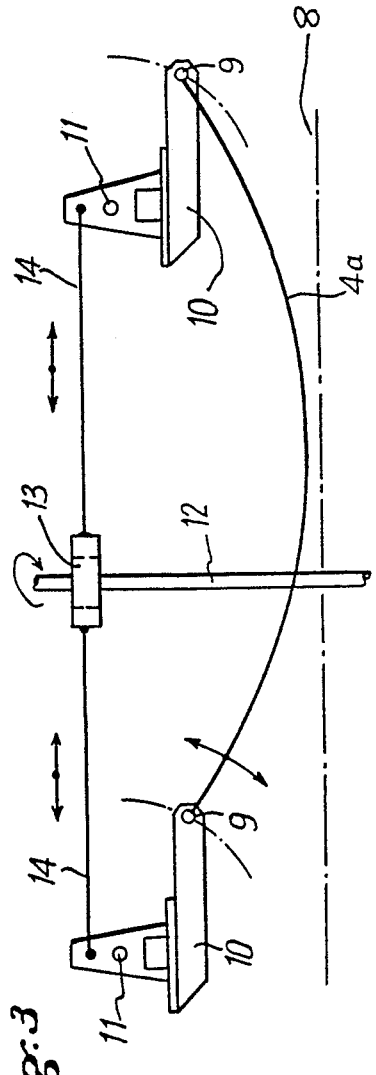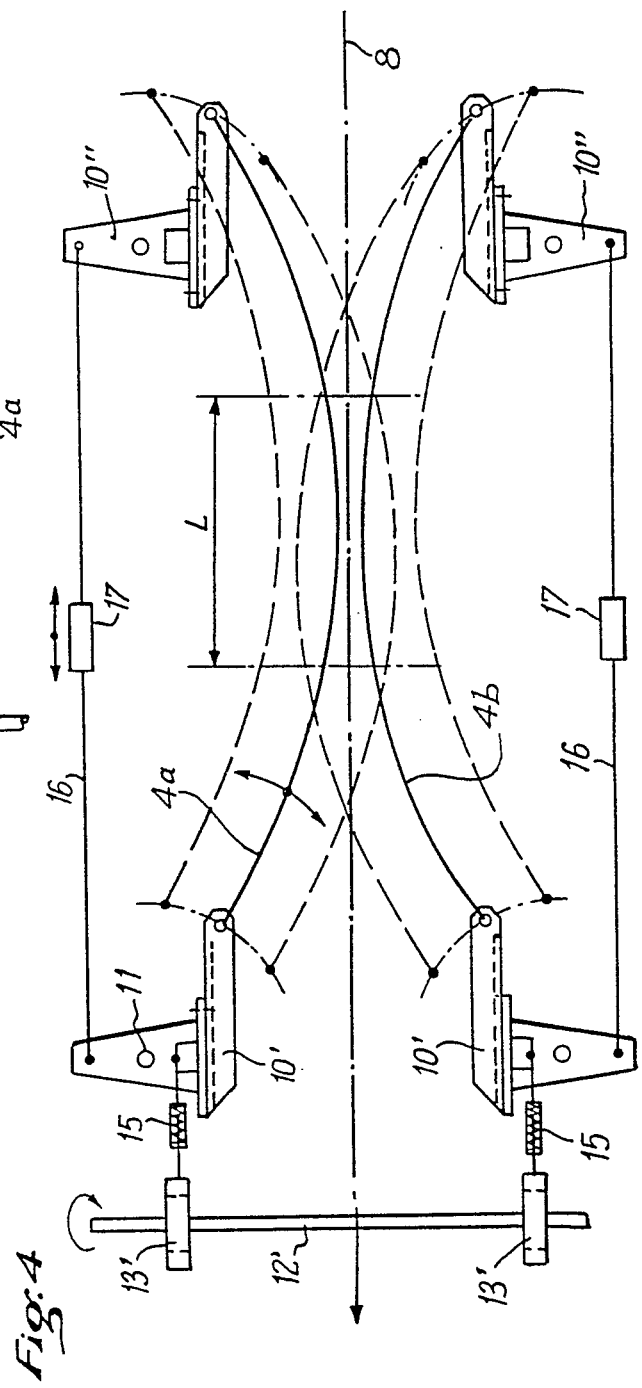

MACHINE FOR HARVESTING BERRIES, AND PARTICULARLY, GRAPES

BACKGROUND OF THE INVENTION

This invention relates to a machine for harvesting berries, and particularly, grapes, and more particularly a machine of the type comprising a straddling frame on which are mounted two sets of shaking elements, each on one side of the median plane of the machine, said shaking elements consisting of rods curved in an approximately horizontal plane and exhibiting their convexity in the direction of said median plane.

Such machines are already known but they generally exhibit the drawbacks of assuring an imperfect harvest, on the one hand, and of damaging the plants, on the other hand.

SUMMARY OF THE INVENTION

This invention aims at reducing these difficulties.

For this purpose, the invention has as its object a machine for harvesting berries, and particularly, grapes, comprising a straddling frame on which are mounted two sets of shaking elements, each on one side of the median plane of the machine, said shaking elements consisting of rods curved in an approximately horizontal plane and exhibiting their convexity in the direction of said median plane, characterized in that each end of each rod is jointed to a support mounted to pivot around an approximately vertical pin, drive means being provided to move, in phase, the supports of rods on the same side of the median plane so as to move the rods parallel to themselves, and to move, in phase opposition, the supports of the rods located on one of the sides of the median plane relative to the supports of the rods located on the other side of the medium plane so that, when one of the sets of rods approaches the median plane, the other set of rods moves away from it.

In a particular embodiment of the invention, said drive means are connected to supports corresponding to one of the ends of the rods of each of the sets of rods, means, optionally comprising shock absorbers, assuring the connection between said supports corresponding to one of the ends of the rods and the supports corresponding to the other end of the rods.

According to another embodiment, said drive means are connected to all the rod supports.

These drive means can particularly comprise a shaft provided with two eccentrics.

BRIEF DESCRIPTION OF THE DRAWING

There will now be described by way of nonlimiting example a particular embodiment of the invention with reference to the accompanying diagrammatic drawings in which:

FIG. 3 is a view, on enlarged scale, of a set of shaking elements of this machine, and FIG. 4 is a view of the sets of shaking elements in a variant embodiment.

DESCRIPTION OF THE PREFERRED EMBODIMENTS

Figure 1:
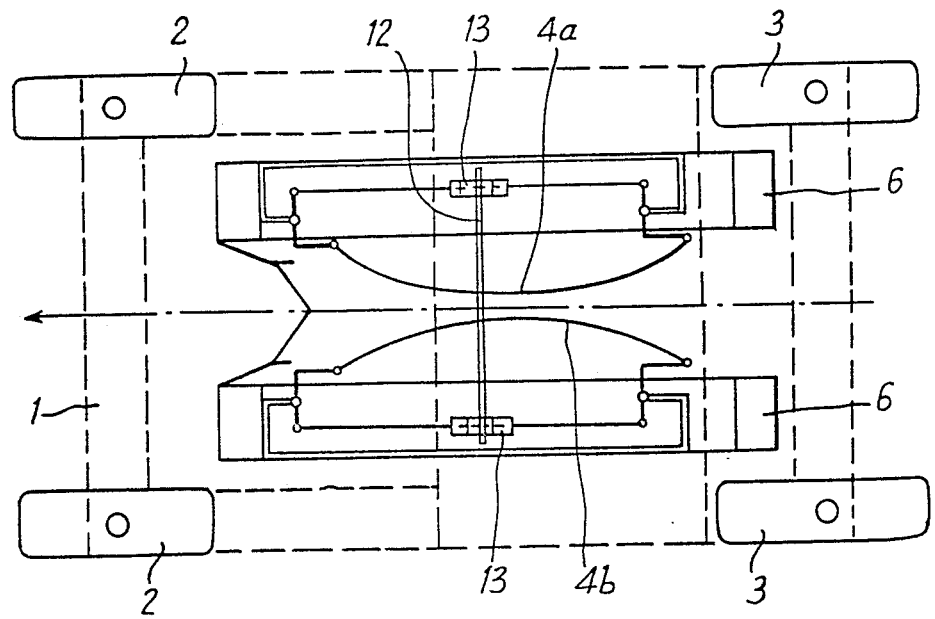
FIG. 1 is a top view of a machine according to the invention.
Figure 2:
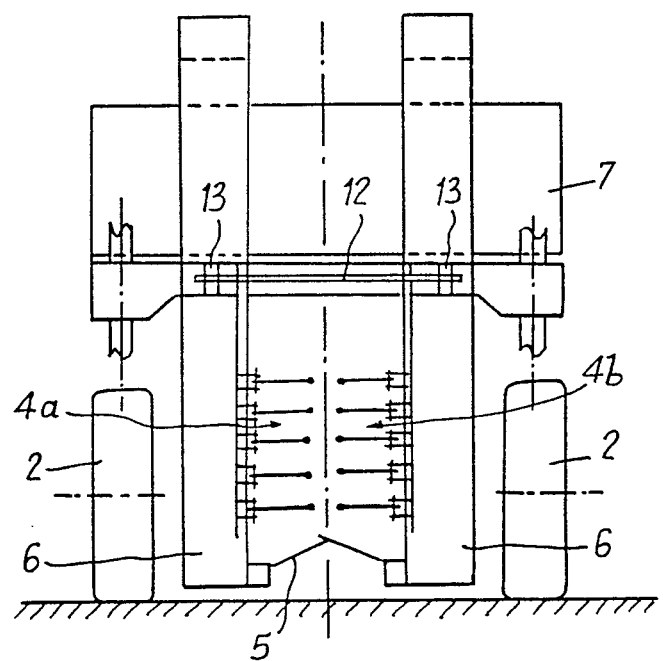
FIG. 2 is a front view.

The machine of FIGS. 1 to 3 comprises in a known way a carrying frame 1 in the shape of a tunnel to enable it to straddle a row of vines.

Front wheels 2 and back wheels 3 are mounted on the frame to enable the machine to travel over the ground.

This frame also carries two sets 4a and 4b of shaking elements to shake the vines as it advances, so that the bunches of grapes or individual grapes fall on a set of scales 5 from which they are brought by two conveyors 6 into a receiving bucket 7.

If reference is now made more particularly to FIG. 3, it is seen that each shaking element 4a (or 4b) is in the form of a curved rod exhibiting its convexity in the direction of median axis 8 of the machine. These rods are approximately horizontal in the normal operating position.

The ends of rods 4a are mounted at each of their ends by a vertical joint 9 or, as a variant, by a ball joint, allowing a certain vertical travel, on square supports 10, which are mounted to rotate on the frame of the machine around vertical pins 11.

The distances between pins 9 and 11 in the front and back of the machine are approximately equal or slightly different.

A drive shaft 12 also mounted to rotate on the frame of the machine and driven by any suitable means, carries, at each of its ends, an eccentric 13 connected by links 14 to the end of supports 10 opposite joints 9.

It is found that when shaft 12 rotates, it causes oscillations of supports 10 around pins 11 so that joints 9 describe parallel arcs of circles. Thus, shaking elements 4a move while remaining parallel to themselves alternately approaching median plane 8 and going away from it. Eccentrics 13 are mounted so that when shaking elements 4a approach plane 8, elements 4b move away from it, and vice-versa.

In the variant of FIG. 4, drive shaft 12' is placed at the front of the machine and eccentrics 13' are connected by links 15 only to front supports 10'. These front supports 10' are connected to back supports 10" by rods 16 incorporating shock absorbers 17.

Eccentrics 13' being mounted on diametrically opposite shaft 12', it is noted that, also in this case, supports 10' and 10" located on the same side of the machine move in phase so that shaking elements 4a and 4b respectively move parallel to themselves, while supports 10' and 10" located on one of the sides of the machine move in phase opposition relative to supports 10' and 10" located on the other side of the machine, so that, when shaking elements 4a approach median plane 8, supports 4b move away from it, and vice-versa.

Such an arrangement offers the advantage of performing an effective shaking of the vines over a large length L without thereby damaging them, because the distance between shaking elements 4a and shaking elements 4b remains approximately constant. Further, no risk of racing the shaking elements is to be feared since both these shaking elements and their drive means are rigid and positively controlled by the rotation of shafts 12 or 12'.

Various variants and modifications can, of course, be made in the above description without thereby going outside the scope or spirit of the invention.

I claim:

1. Machine for harvesting berries, and particularly, grapes, comprising a straddling frame (1) on which are mounted two sets of shaking elements (4a, 4b), each on one side of median plane (8) of the machine, said shaking elements consisting of rods curved in an approximately horizontal plane and exhibiting their convexity in the direction of said median plane, characterized in that each end of each rod is jointed to a support (10;10–;10″) mounted to pivot around an approximately vertical pin (11), drive means (12;12′) being provided to move, in phase, the supports of rods on the same side of the median plane so as to move the rods parallel to themselves, and to move, in phase opposition, the supports of the rods located on one of the sides of the median plane relative to the supports of the rods located on the other side of the median plane so that, when one of the sets of rods approaches the median plane, the other set of rods moves away from it.

2. Machine according to claim 1, wherein said drive means are connected to supports corresponding to one of the ends of the rods of each of the sets of rods, means (16) assuring the connection between said supports corresponding to one of the ends of the rods, and the supports corresponding to the other end of the rods.

3. Machine according to claim 1, wherein said drive means are connected to all the rod supports.

4. Machine according to any of claims 1 to 3, wherein said drive means comprise a shaft (12;12′) provided with two eccentrics (13;13′).

5. Machine according to claim 2, wherein shock absorbers (17) are mounted on said connecting means (16).

* * * * *